US009619247B2

(12) United States Patent
Kuhn et al.

(10) Patent No.: US 9,619,247 B2
(45) Date of Patent: Apr. 11, 2017

(54) ENABLING FAST STRING ACQUISITION IN AN OPERATING SYSTEM FOR EFFICIENT INTEROPERATIONS WITH VARIOUS LANGUAGE PROJECTIONS

(75) Inventors: Benjamin Kuhn, Bellevue, WA (US); Stephan T. Lavavej, Redmond, WA (US); Wei Zeng, Sammarnish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 13/183,458

(22) Filed: Jul. 15, 2011

(65) Prior Publication Data
US 2013/0019254 A1    Jan. 17, 2013

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/52* | (2006.01) |
| *G06F 9/50* | (2006.01) |

(52) U.S. Cl.
CPC .......... *G06F 9/4423* (2013.01); *G06F 9/5022* (2013.01); *G06F 9/526* (2013.01)

(58) Field of Classification Search
CPC ....... G06F 9/526; G06F 9/4423; G06F 9/5022
USPC ........................................................ 719/328
See application file for complete search history.

(56) References Cited

U.S. PATENT DOCUMENTS

| | | | |
|---|---|---|---|
| 5,787,431 A * | 7/1998 | Shaughnessy | |
| 6,038,588 A | 3/2000 | Nagarajayya et al. | |
| 6,230,213 B1 * | 5/2001 | Davidson ............ | G06F 12/0261 707/999.103 |
| 6,363,467 B1 | 3/2002 | Weeks | |
| 6,718,550 B1 * | 4/2004 | Lim ........................ | G06F 9/548 710/310 |
| 7,571,440 B2 * | 8/2009 | Vessey et al. ................ | 719/312 |
| 2004/0187098 A1 * | 9/2004 | Garg et al. .................... | 717/127 |
| 2006/0206903 A1 * | 9/2006 | Lawrence et al. ............ | 719/313 |
| 2012/0281690 A1 * | 11/2012 | Li et al. ........................ | 370/352 |

OTHER PUBLICATIONS

Tore Risch, "aStorage, a main-memory storage manager", Sep. 3, 2009, retrieved from http://user.it.uu.se/~torer/publ/aStorage.pdf on Feb. 27, 2013, pp. 1-26.*
Ware, Simon, "Modular Controllability Verification Using Language Projection", Retrieved at http://nzcsrsc08.canterbury.ac.nz/site/proceedings/Individual_Papers/pg170_Modular_Controllability_Verification_Using_Language_Projection.pdf>>, Apr. 2008, pp. 170-176.

(Continued)

*Primary Examiner* — Tuan Dao
*Assistant Examiner* — William C Wood
(74) *Attorney, Agent, or Firm* — Timothy Churna; Daniel Choi; Micky Minhas

(57) ABSTRACT

In one embodiment, a memory resource manager may pass data memory structures between application components on a computing device. A memory resource 306 may store a data memory structure for a holding application component 302. A processor 120 may pass a handle representing the data memory structure to a calling application component 308 upon access by the calling application component 308.

20 Claims, 6 Drawing Sheets

(56) References Cited

OTHER PUBLICATIONS

Musson, James, "Improving String Handling Performance in .NET Framework Application", Retrieved at <<http:// msdn.microsoft.com/en-us/library/aa302329.aspx>>, Apr. 2003, pp. 16.
Franklin, Carl, "Manipulate Strings Faster in VB.NET", Retrieved Date at <<http://msdn.microsoft.com/en-us/library/aa260972%28VS.60%29.aspx>>, Jul. 2001, pp. 9.
"Developer Backgrounds in Memory Management", Retrieved at <<http://msdn.microsoft.com/en-us/library/yhbk54wa(v=vs.80).aspx>>, Retrieved Date: May 4, 2011, pp. 3.
Kraus, Alois, "StringBuilder vs. String / Fast String Operations with .NET 2.0", Retrieved at http://www.codeproject.com/Kb/cs/StringBuilder_vs_String.aspx? fid=326464&df=90&mpp=25&noise=3&sort=Position&view=Quick&fr=26>>, Mar. 30, 2007, pp. 13.
Van Der Colff, Andre, "Faster String Building", Retrieved at http://www.codeproject.com/Kb/string/FastStringBuilderaspx>>, Mar. 30, 2008, pp. 13.

* cited by examiner

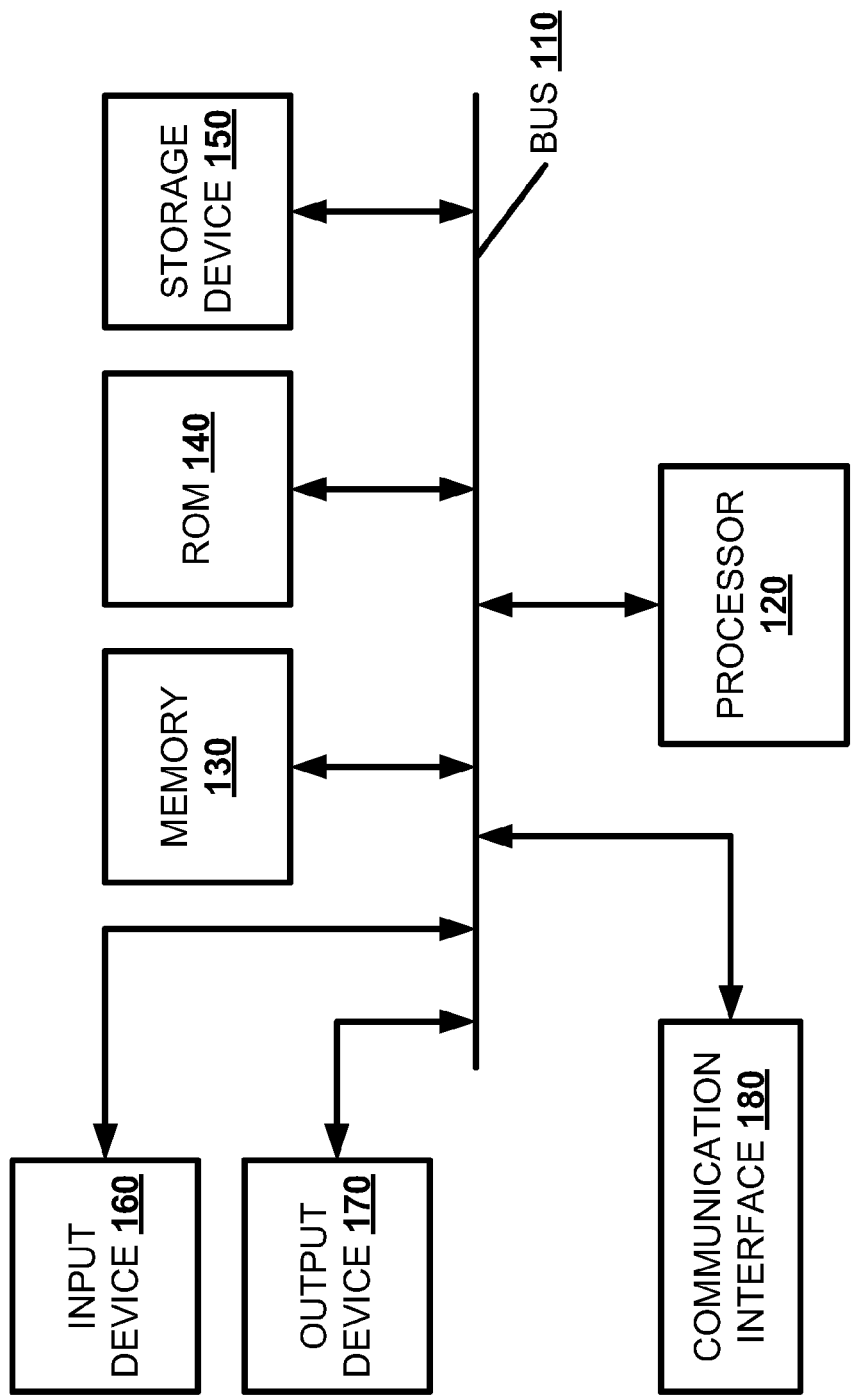

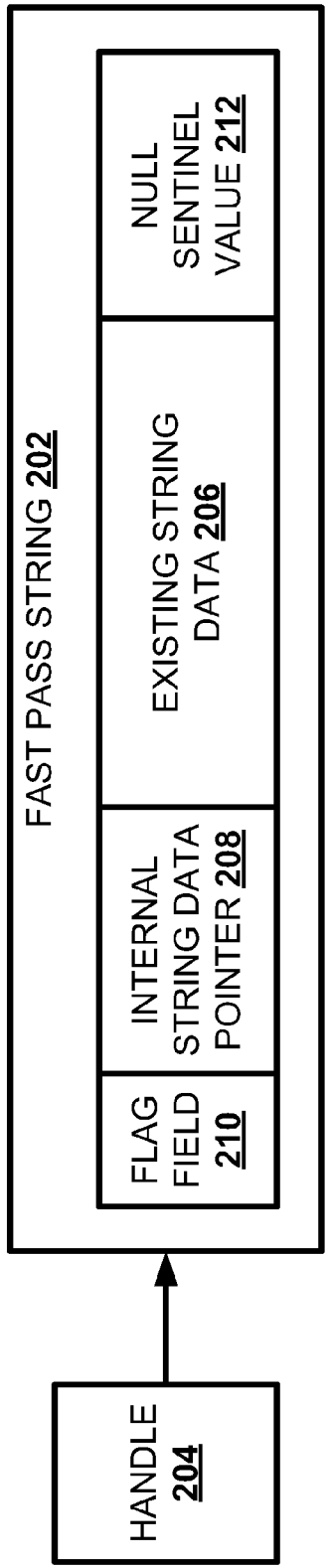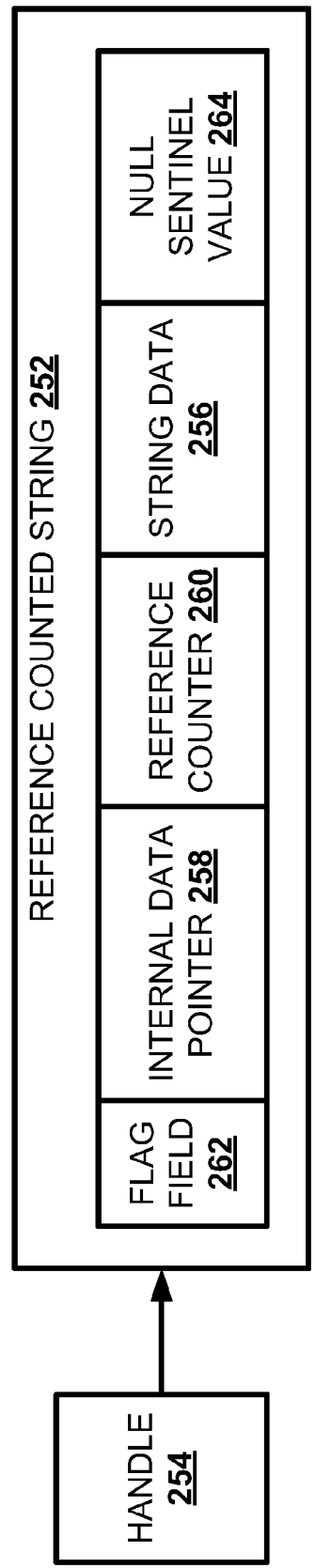

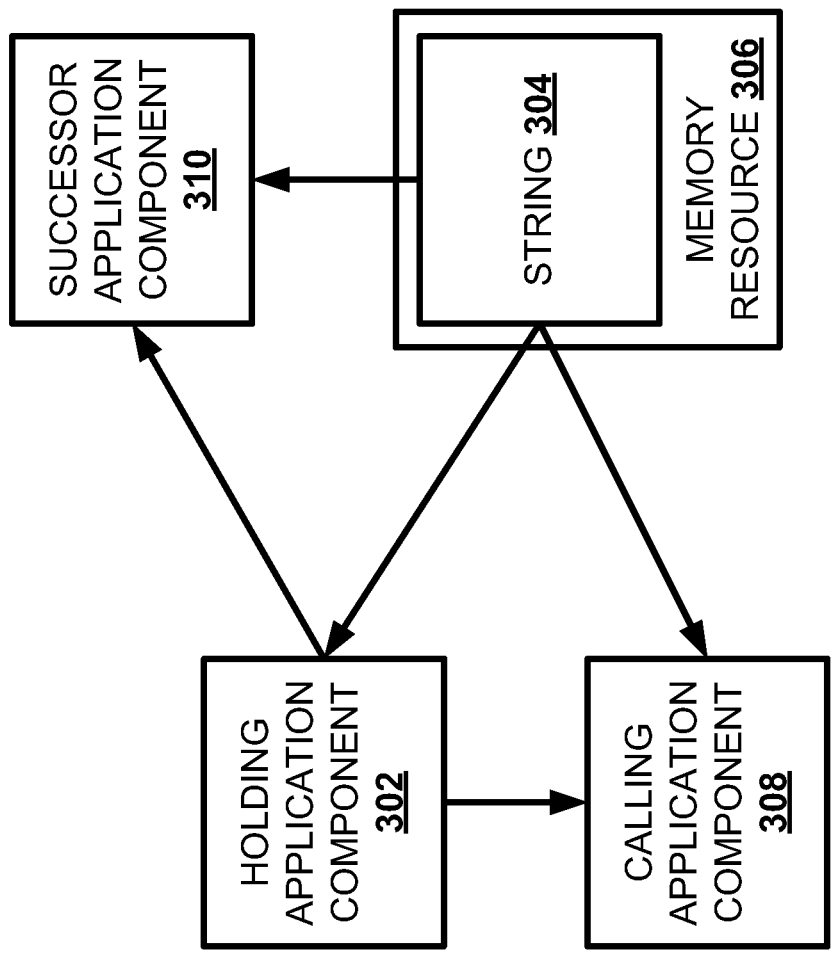

*400*

ENABLING FAST STRING ACQUISITION IN AN OPERATING SYSTEM FOR EFFICIENT INTEROPERATIONS WITH VARIOUS LANGUAGE PROJECTIONS

BACKGROUND

A data memory structure is a general format for storing data in a computer memory device. The data memory structure may be a string. A string is a finite sequence of numerical values that are interpreted as computer symbols, such as characters or integers. A data memory structure may be shared by a first application component and a second application component of one or more software programs. When the second application component calls a data memory structure held by the first application component, the second application component creates a duplicate of the data memory structure, consuming memory resources.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a memory resource manager passing data memory structures between application components on a computing device. A memory resource may store a data memory structure for a holding application component. A processor may pass a handle representing the data memory structure to a calling application component upon access by the calling application component.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates, in a block diagram, one embodiment of a computing device.

FIGS. 2A-B illustrate, in a block diagram, embodiments of a handle and string association.

FIG. 3 illustrates, in a block diagram, one embodiment of a handle pass.

DETAILED DESCRIPTION

Figure 4:
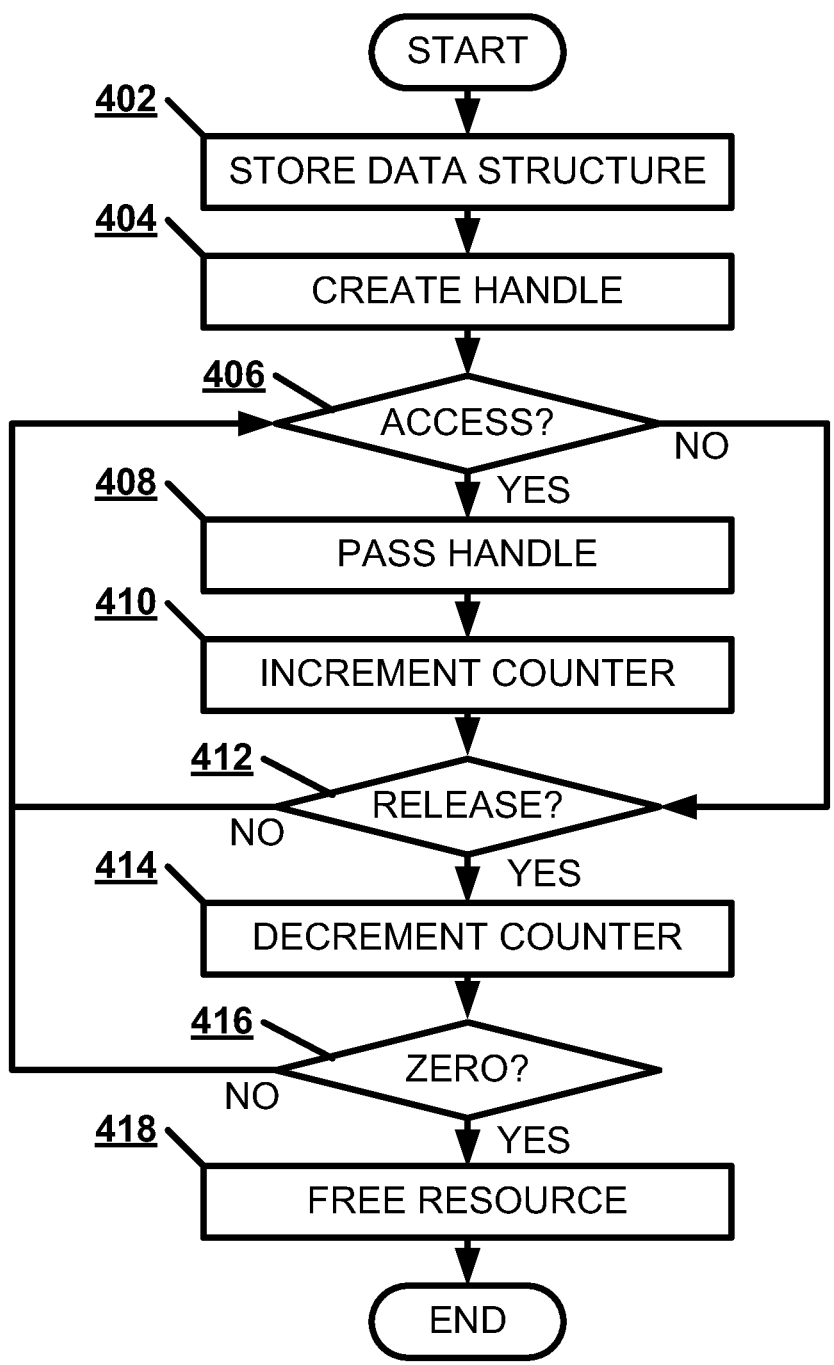
FIG. 4 illustrates, in a flowchart, one embodiment of a method of using a holding application component to pass a handle for a reference counted data memory structure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a memory resource manager for a computing device.

The memory resource manager may efficiently transfer string data among independent application components running in a single process. An application component is a component of a software application, such as a function or class. The memory resource manager may use a multi-tiered memory management scheme for efficiently handling immutable data, or data that is unchanging over time, in a procedural programming model. The memory resource manager may abstract away from the program when copying of the data occurs. If the data were changing over time, the inability to rationalize about when copying of the data occurs may affect the writing of correct nontrivial programs.

The memory resource manager may use a handle-based scheme. A handle is an opaque value that may be used by a calling application component to indicate to a holding application component a specific resource. Unlike with a pointer, the calling application component may use the handle for the purpose of specifying a memory resource already known to the holding application component. Each handle may be an identifier used to reference a particular instance of a string. For purposes of programming, the handle may be called HSTRING. For instance, in C++ code, HSTRING may be described as:

```
HSTRING myString;
bool result = CreateString(L"abc", 3, &myString);
```

The function may create a handle to an in-memory resource containing the value "abc". If another application component in the system maintains a copy of that string, that application component may implement the following function:

```
bool SetStringData(HSTRING input)
{
    return DuplicateString(input, &g_myString);
}
```

The application component may implement the function to keep the string in memory longer than the application component providing the string guarantees.

At this point, the resource managed by the handle input and the resource managed by the handle g_myString may have independent lifetimes as viewed by the application components. Both the calling application component and the holding application component may independently decide when to release a copy of the resource. When each application component is done with the string, the application component may call a DeleteString function, indicating to the system that the resource is no longer being used. The DeleteString function may read:

```
void onExit( )
{
    DeleteString(&g_myString);
}
```

The handle based-scheme may abstract away the details, allowing the underlying system to use any of a large number of memory management schemes or combinations thereof to manage the lifetime of the string. For example, the memory resource manager may use a reference counting scheme. In this scheme, the call to CreateString may allocate memory that includes an intrusive reference counting block, the string data, and a flags field used by the system. The holding application component may set the reference count to 1, set an "s" value in the flags field to indicate that this is a reference counted string, and may return a value that represents the location of the memory as the handle value. The call DuplicateString may increment the reference count and may supply a handle to the caller representing the same location in memory. The call DeleteString may decrement the reference count, but does not free the memory unless the reference count is zero after decrementing.

Additionally, the memory resource manager may use a fast-pass mechanism. In procedural and functional programming languages, a pervasive convention may have a caller of a function responsible for guaranteeing that data provided to that function is usable by the called function until that function returns control to the caller. Thus, in the example function SetStringData above, the function may safely assume that the resource referred to by the variable input is usable until that function finishes executing, and returns control back to the caller. Conversely, this convention also may dictate that the called function may not assume that the resources referred to by input are valid after returning control unless the function takes action to ensure that the resource remains valid. In a reference counting scheme, for example, that action may involve incrementing the reference count.

In many cases, the data being provided to a function by a caller may already reside in memory but may not be prepared in the way that the recipient of the data expects. This problem may be particularly true when dealing with a string in C and C++, as these programming languages do not define a canonical string representation. For example, a component object model (COM) application programming interface (API) may use string data provided in a format referred to as basic string (BSTR), with a null-terminated character data preceded by a 32-bit value indicating the number of characters that follow. Other non-component object model application programming interfaces do not supply or require the prefix when handling strings. This mismatch frequently may cause the software to create an extra copy of the string just to satisfy the different memory layout requirements, despite the data already being present in memory. Depending on the sequence of application components consuming the string, this duplication may lead to many copies of the same piece of data during the course of completing an operation.

The memory resource manager may mitigate the creation of these additional copies by providing a second fast-pass memory management scheme. The fast-pass mechanism specifically refers to the mechanism wherein a function that invokes another function providing a resource is managed using some other memory scheme, but appears to be in the HSTRING format to the called function. A function may use this fast pass mechanism provided the data has a very basic layout and the data is stable for the duration of time that the HSTRING representing that fast-pass string is in use. The basic layout may have a sentinel character value of 0 at the end.

An example of a fast pass C++ function may be as follows:

```
void f(char* characters)
{
unsigned char header[OPAQUE_HEADER_SIZE];
HSTRING str;
CreateStringReference(characters, wcslen(characters),
&header, &str);
g(str);
h(str);
}
```

A CreateStringReference function may allow the caller to create an HSTRING that, instead of using reference counting, instead refers to string data provided by the function itself. In this case, function f( ) may provide a basic layout by having callers provide data in the correct format. The function f( ) may provide stability by relying on the lifetime convention.

The fast-pass mechanism, implemented in CreateStringReference, may use an opaque, fixed-size buffer provided by the caller to store private data. The caller may know the size but not the contents, allowing the data to be allocated on the stack rather than the heap, which is much faster. The private data may have a flag indicating that the string is a fast-pass string, rather than a reference counted string. The fast-pass mechanism may set up a pointer to the caller's copy of the string data, rather than allocating memory and making a copy of that data. The function may then return an HSTRING to that reference. By calling CreateStringReference, the application component may set up an HSTRING without causing any additional system memory to be allocated. Within functions g( ) and h( ), the string set up by f( ) may be used the same as if it had been created using CreateString( ). Other system provided methods for operating on the string may use the flags field to determine the memory layout and access the string data.

While the function calling DuplicateString may perceive no difference in operation, the DuplicateString function may behave differently when presented with a string created using the CreateStringReference function. Because the memory containing the string has a lifetime that may not be controlled by the system string application programming interface, the DuplicateString function may use the data referred from the fast-pass HSTRING. Thus, the DuplicateString function may effectively call or perform the same operations as the CreateString function, providing to the caller the new handle resulting from the CreateString call.

Additionally, the DuplicateString function may place an HSTRING in the fast-pass string's opaque data referring to the created string. This embedded handle may allow subsequent calls to DuplicateString to re-use the same reference counted HSTRING in subsequent calls, rather than creating a new reference counted string each time. Using the example above, if function g( ) and function h( ) both call the DuplicateString function, each function may pass the fast pass string to the DuplicateString function. If the fast-pass string data does not track the fact that a copy was made, the fast-pass string may be copied twice, each time consuming more system resources. With this scheme, the first copy may update the fast pass string, so that the second DuplicateString call made by function h( ) may result in only an increment to the reference count, rather than an allocation of more system resources. The function f( ) may call the DeleteString function with the HSTRING, so that the system may remove that string's internal string when applicable.

Thus, in one embodiment, a memory resource manager may pass data memory structures between application components on a computing device. A memory resource may store a data memory structure for a holding application component. A processor may pass a handle representing the data memory structure to a calling application component upon access by the calling application component.

FIG. 1 illustrates a block diagram of an exemplary computing device 100 which may act as memory resource manager. The computing device 100 may combine one or more of hardware, software, firmware, and system-on-a-chip technology to implement memory resource management. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface or a mobile transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

FIG. 2A illustrates, in a block diagram, one embodiment of a handle and fast pass string association 200. A data memory structure, such as a fast pass string 202, may be represented by a handle 204. A handle 204 is an opaque value indicating a position of a memory resource storing the data memory structure. The fast pass string 202 may have an existing string data set 206, an internal string data pointer 208, a flag field 210, and a null sentinel value 212. The existing string data set 206 is a sequence of computer symbols. The internal string data pointer 208 may point to an existing buffer provide by a caller elsewhere in the system. The lifetime of the string data may not be maintained by the memory resource manager, but the caller may provide the string data stability during the function call. The flag field 210 is a set of one or more flags indicating the status of the string 202. The flag field 210 may have a "Fast Pass" flag indicating that the string 202 may be fast passed from a first application component to a second application component. The null sentinel value 212 is a zero value indicating the end of the fast passed string 202.

FIG. 2B illustrates, in a block diagram, one embodiment of a handle and reference counted string association 250. A data memory structure, such as a reference counted string 252, may be represented by a handle 254. The reference counted string 252 may have a string data set 256, an internal data pointer 258, a reference counter 260, a flag field 262, and a null sentinel value 264. The string data set 256 is a sequence of computer symbols. The internal data pointer 258 points to the string data set 256. The reference counter 260 is a tally of the number of application components referencing the string 252. The lifetime of the entire memory data structure may be managed by the memory resource manager through the reference counter 260. The flag field 262 may have a "Reference Counted" flag indicating that the string is a reference counted string. The null sentinel value 264 is a zero value indicating the end of the string 252.

FIG. 3 illustrates, in a block diagram, one embodiment of a handle pass 300. A holding application component 302 is an application component that has control of a string 304 stored on a memory resource 306. A calling application component 308 may seek to access the string 304. The holding application component 302 may pass a handle for the string 304 to the calling application component 308. The calling application component 308 may use the handle to access the string 304. The holding application component 302 may increment a reference counter 260 upon passing the handle to calling application component 308.

A successor application component 310 may also seek to access the string 304. The holding application component 302 may pass a handle for the string 304 to the successor application component 310. The successor application component 308 may use the handle to access the string 304. The holding application component 302 may increment the reference counter 260 upon passing the handle to the successor application component 310. Incrementing the reference counter 260 may act as a promotion trigger, causing the calling application component 308 to promote the string 304 by creating a data memory structure copy.

FIG. 4 illustrates, in a flowchart, one embodiment of a method 400 of using a holding application component 302 to pass a handle for a reference counted data memory structure, such as a reference counted string 252. A holding application component 302 may store a data memory structure, such as a string 252, in a memory resource 306 (Block 402). The holding application component 302 may create a handle 254 representing the data memory structure (Block 404). If the calling application component 308 accesses the data memory structure (Block 406), the holding application component 302 may pass the handle 254 to the calling application component 308 upon access by the calling application component 308 (Block 408). The holding application component 302 may increment a reference counter 260 in the data memory structure upon passing the handle 254 to the calling application component 308 (Block 410). If an application component, such as the holding application component 302 or the calling application component 308, releases the data memory structure (Block 412), the holding application component 302 may decrement the reference counter 260 (Block 414). If the reference counter 260 reaches zero (Block 416), the holding application component 302 may free the memory resource 306 (Block 418).

Figure 5:
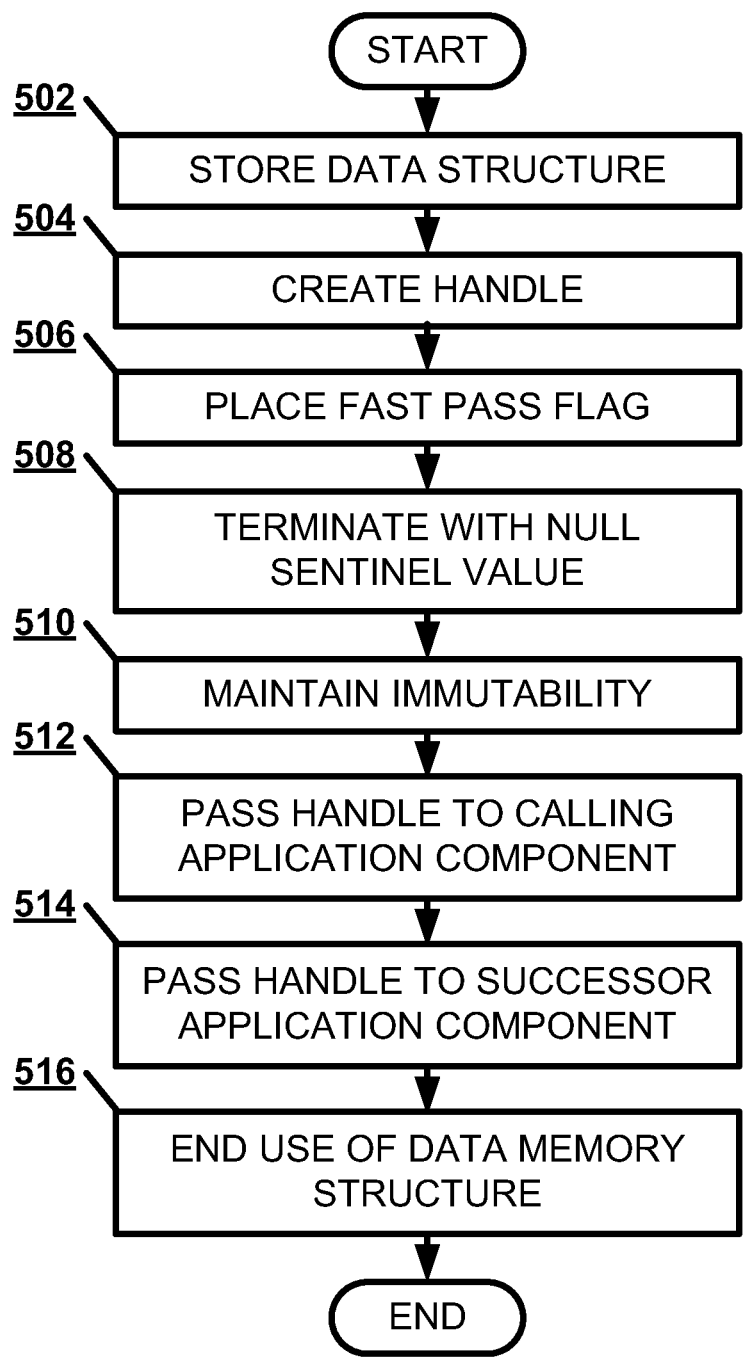
FIG. 5 illustrates, in a flowchart, one embodiment of a method of using a holding application component to fast pass a handle for a data memory structure.

FIG. 5 illustrates, in a flowchart, one embodiment of a method 500 of using a holding application component 302 to fast pass a handle for a data memory structure, such as a fast pass string 202. A holding application component 302 may store a data memory structure in a memory resource 306 (Block 502). The holding application component 302 may store the data memory structure to contain a string data set 206. The holding application component 302 may create a handle 202 representing the data memory structure (Block 504). The holding application component 302 may place a fast pass flag 210 in the data memory structure to indicate a fast pass data memory structure (Block 506). The holding application component 302 may terminate a string data set 206 contained in the data memory structure with a null sentinel value 212 (Block 508). The holding application component 302 may maintain the data memory structure as immutable for a lifespan determined by the holding application component 302 (Block 510). The holding application component 302 may pass the handle to the calling application component 308 (Block 512). The holding application component 302 may pass the handle to a successor application component 310, acting as a promotion trigger (Block 514). The holding application component 302 may end use of the data memory structure, acting as the promotion trigger to the calling application component 308 (Block 516).

Figure 6:
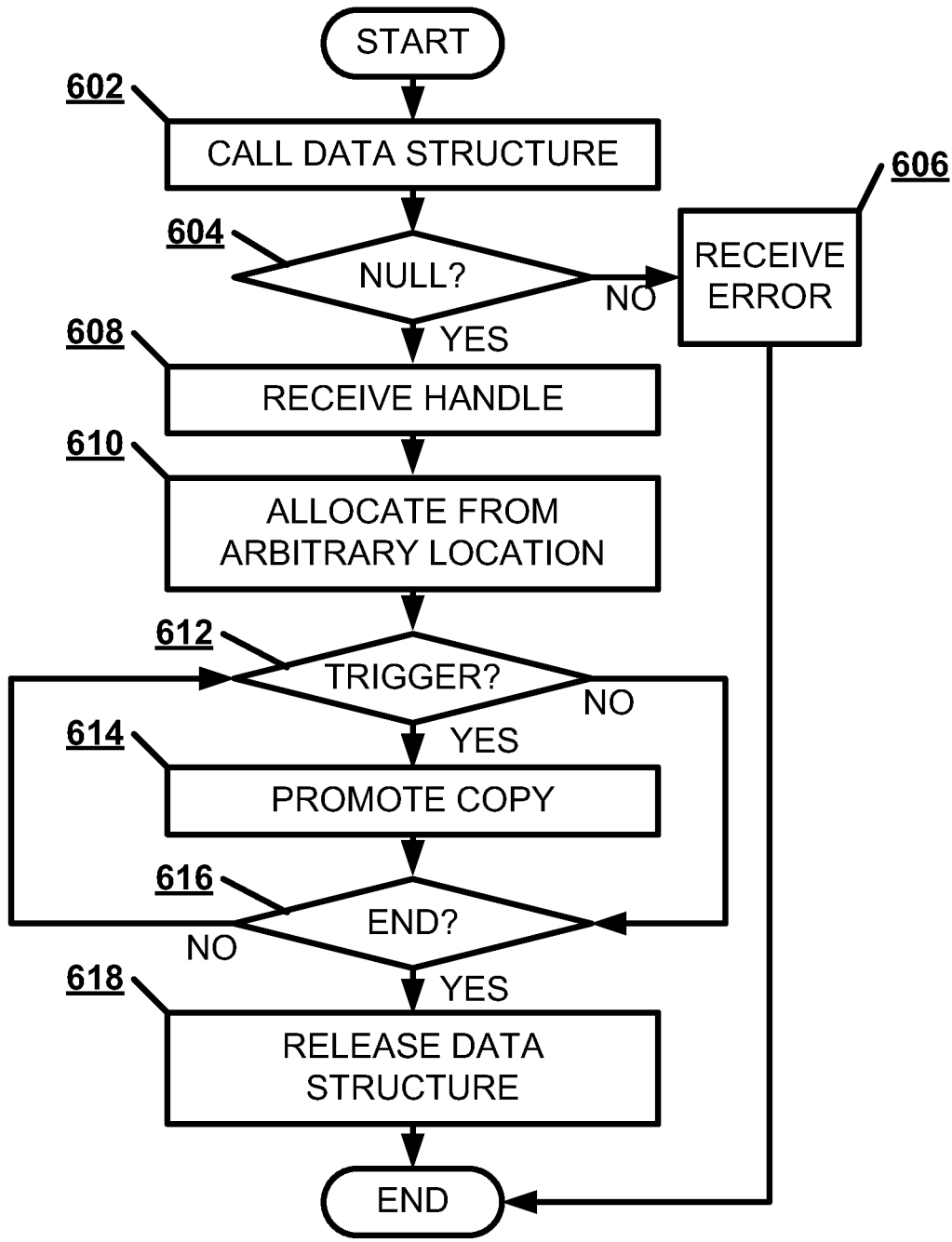
FIG. 6 illustrates, in a flowchart, one embodiment of a method of using a calling application component to receive a fast pass of a handle for a data memory structure.

FIG. 6 illustrates, in a flowchart, one embodiment of a method 600 of using a calling application component 308 to receive a fast pass of a handle 202 for a data memory structure, such as a fast pass string 202. The calling application component 308 may call a data memory structure stored in a memory resource 306 in a holding application component 302 (Block 602). If the data memory structure is not terminated by a null sentinel value (Block 604), the calling application component 308 may receive an error message (Block 606). Otherwise, the calling application component 308 may receive a handle 204 representing the data memory structure from the calling application component 308 (Block 608). The calling application component 308 may allocate the memory resource 306 from an arbitrary memory location (Block 610).

If a promotion trigger occurs (Block 612), the calling application component 308 may create, or "promote", a data memory structure copy (Block 614). The promotion trigger may be the holding application component 302 passing the handle to a successor application component 310, or the holding application component 302 ending use of the data memory structure. If the calling application component 308 is finished with the data memory structure (Block 616), the calling application component 308 may release the data memory structure, causing a reference counter in the data memory structure to be decremented (Block 618).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   storing a string in a memory resource with a holding application component having control of the string;
   passing a handle specifying the string to a calling application component upon access by the calling application component; and
   maintaining the string as immutable for a lifespan of the string by having the calling application component create a string copy in the memory resource caused by the holding application executing at least one of passing the handle to a successor application component and ending use of the string.

2. The method of claim 1, further comprising:
   creating the handle in the holding application component.

3. The method of claim 1, further comprising:
   incrementing a reference counter in the string upon passing the handle to the calling application component.

4. The method of claim 1, further comprising:
   decrementing a reference counter in the string when the calling application component releases the string.

5. The method of claim 4, further comprising:
freeing the memory resource when the reference counter reaches zero.

6. The method of claim 1, further comprising:
placing a fast pass flag in the string to indicate a fast pass string.

7. The method of claim 1, further comprising:
terminating the string with a null sentinel value.

8. The method of claim 1, further comprising:
passing the handle to a successor application component.

9. The method of claim 1, further comprising:
ending use of the string in the holding application component.

10. A computing device having memory to store a set of instructions detailing a method stored thereon that when executed by one or more processors cause the one or more processors to perform the method, the method comprising:
calling, with a calling application, a holding application component to access a string stored in a memory resource controlled by the holding application component;
receiving a handle representing the string from the holding application component; and
creating a string copy in the memory resource caused by a change to a reference counter in the string.

11. The computing device of claim 10, wherein the method further comprises:
releasing the string when the calling application component is finished with the string; and
causing the reference counter in the string to be decremented.

12. The computing device of claim 10, wherein the method further comprises:
receiving an error message when the string is not terminated by a null sentinel value.

13. The computing device of claim 10, wherein the method further comprises:
creating a string copy upon the handle being passed to a successor application component.

14. The computing device of claim 10, wherein the method further comprises:
creating a string copy upon the holding application component ending use of the string.

15. The computing device of claim 10, wherein the method further comprises:
allocating the memory resource from an arbitrary memory location.

16. A memory resource manager, comprising:
a memory resource configured to store an immutable string having a reference counter with a holding application component having control of the immutable string;
a processor configured to execute the holding application to pass a handle representing the immutable string to a calling application component upon access by the calling application component and configured to execute the calling application component to create a string copy caused by the holding application executing at least one of passing the handle to a successor application component or ending use of the immutable string.

17. The memory resource manager of claim 16, wherein the holding application component is configured to increment the reference counter upon passing the handle to the calling application component and decrement the reference counter upon the calling application component releasing the data memory structure.

18. The memory resource manager of claim 16, wherein the holding application component is configured to free the memory resource when the reference counter reaches zero.

19. The memory resource manager of claim 16, wherein the holding application is configured to pass the handle to the successor application component.

20. The memory resource manager of claim 16, wherein the holding application component is configured to end use of the string.

* * * * *